United States Patent Office 3,809,756
Patented May 7, 1974

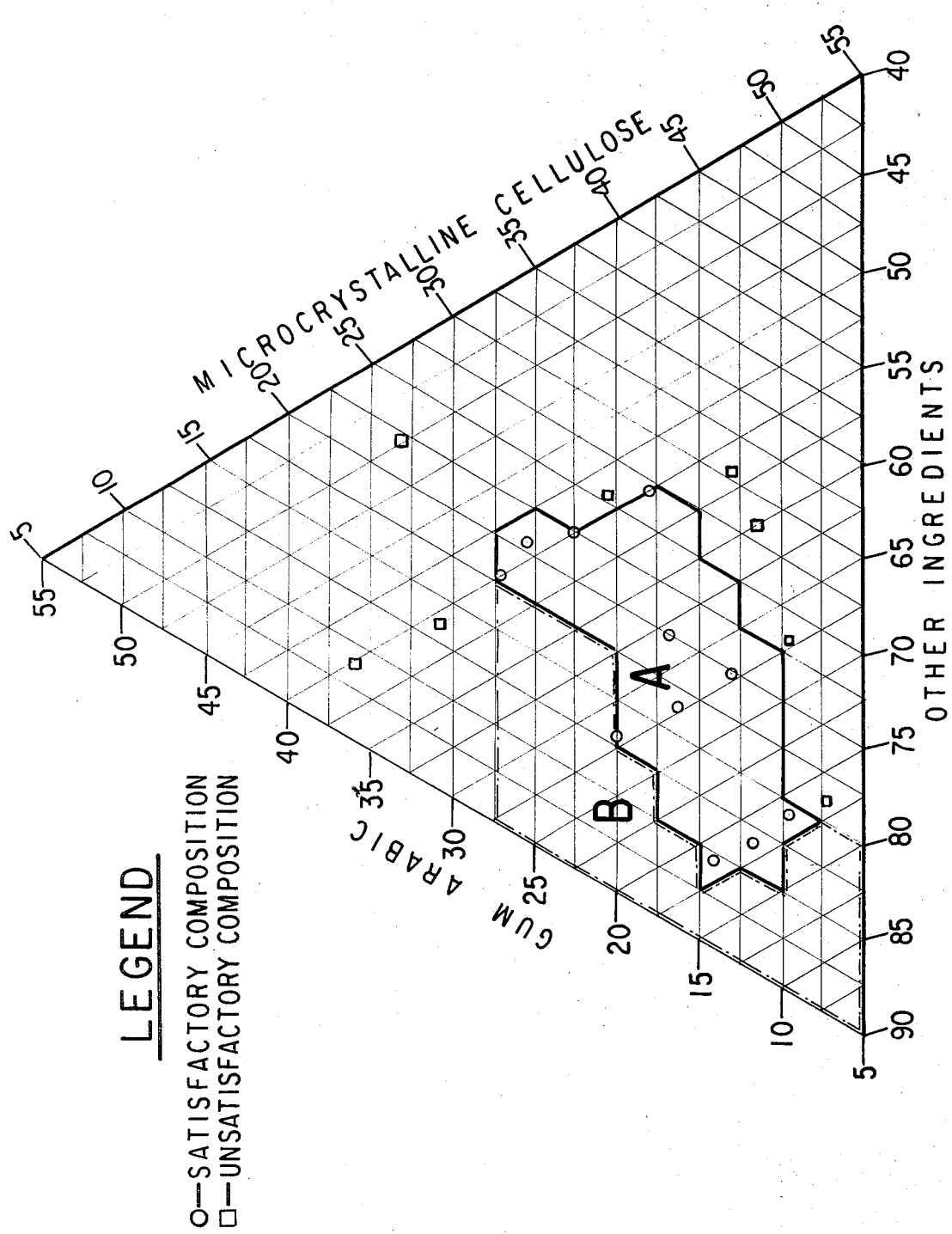

3,809,756
LOWER CALORIE CANDY
John W. Bush, Chicago, and Edmund J. Pyrz, Elk Grove Village, Ill., assignors to American Home Products Corporation, New York, N.Y.
Filed Apr. 27, 1971, Ser. No. 137,909
Int. Cl. A23g 3/00
U.S. Cl. 426—201
2 Claims

ABSTRACT OF THE DISCLOSURE

A reduced calorie candy is described characterized by the substitution of up to about 27 percent gum arabic, up to about 27 percent of microcrystalline cellulose, and soy protein for a portion of the beet sugar, corn syrup, vegetable fat and nutmeats usually used in such compositions. Calorie reduction up to about 35 percent may be obtained without loss of the texture or flavor of high caloric candy.

---

This invention relates to reduced calorie compositions for candy and more particularly relates to compositions for candy which contain up to about 35 percent fewer calories than usual candy compositions without the loss of texture and flavor of full calorie candy. The application is particularly directed to nougat type products. Nougat is a soft, low density candy containing vegetable fat to improve texture and reduce stickiness in the mouth, and also containing flavoring materials such as spices, cocoa, malt, milk products, nutmeats, jellies and other flavoring substances.

The reduced calorie candies that have been known up to the present time are of the "dietetic candy" type. Dietetic candy typically contains no sugar but utilizes substitutes, such as saccharin and sodium cyclamate or calcium cyclamate in its place. Dietetic candy typically has a texture and a flavor noticeably different from that of high calorie candy, because the sugar in candy, as well as flavoring the composition, imparts a texture, or body, to it. The sugar substitutes do not impart the mouth feel, viscosity or bodying properties of sugar to the candy.

Frequently there is a considerable loss in bulk when artificial sweeteners replace carbohydrates in a food formulation. It is known to add various hydrophilic colloids together with sweeteners in an attempt to correct the deficiency. Compounds known to be useful in the control of "texture" of the product include carboxymethylcellulose, alginates, gelatin, carrageenin, arabinogalactan and the like.

Some nougat type candy compositions customarily contain nutmeats which impart flavor, texture, and the like, as well as adding calories. No composition has been known to date which has the same bodying, bulking, and other physical and organoleptic properties of candy, particularly nutmeat-containing candy which at the same time achieves a reduction in calorie content.

It is an object of the present invention to provide a candy composition which has a reduced calorie content but has the texture of nutmeat-containing candy.

It is a particular object of this invention to provide a lower calorie nougat candy composition.

FIG. 1 is a composition diagram showing the range of concentrations of gum arabic, microcrystalline cellulose and other ingredients which have been found to produce satisfactory products, and those which have been found to produce unsatisfactory products. The composition of each of the three major components is given in percent by weight of the total composition. A number of compositions were prepared and tested as is described below. The compositions were evaluated organoleptically and rated either "satisfactory" or "unsatisfactory" for use as commercial nougat. The results are marked on the diagram, the satisfactory compositions being indicated with a circle, and the unsatisfactory compositions with a square. Area A and Area B together define the scope of the present invention, including all of the satisfactory compositions and excluding all of the unsatisfactory compositions. Area A defines the preferred scope of the present invention.

The objects of the present invention may be achieved by the substitution of up to about 27 percent by weight of the total composition of gum arabic (preferably about 9 to 27 percent), up to about 27 percent microcrystalline cellulose (preferably about 9 to 27 percent) for a portion of the beet sugar, corn syrup and vegetable fat usually used in many candy compositions. Furthermore, soy protein compositions may be substituted for the nutmeats customarily present in such candy compositions.

It has been found in compositions containing corn syrup and vegetable fat that, by the proper selection of the amount of the ingredients substituted, the calorie content may be reduced about 35 percent without affecting the texture of the product. The greater the concentration of gum arabic and microcrystalline cellulose, the lower the calorie content. It has also been found that when the ingredients are selected so as to produce a calorie reduction in excess of about 35 percent or more that there results a noticeable bad-tasting, poor textured product.

It has been found that the ratio of gum arabic to cellulose determines the nature of a product and that optimum and maximum levels of usage are dictated by organoleptic properties of the product and limitations of production techniques.

It has been found that a combined total of about 46 percent, or more, of non-nutrients (gum arabic and microcrystalline cellulose) causes excessive sticking in cooking. It was also found that a product formulated to contain about 28 percent nonnutrients does not stick in cooking and has desirable machine packing characteristics. While some sticking and buildup of residue is experienced, it does not seriously interfere with successive batches. Cutting and wrapping of the pieces of candy on production equipment was found to present no unusual difficulty.

The maximum nonnutrient content is about 46 percent with gum to cellulose ratios ranging from 40:60 to 60:40. An especially desirable formulation contains about 25 percent nonnutrient content in a gum to cellulose ratio of 68:32.

Because nougat frequently includes some other substance such as jellies or coconut, it is desirable to add some ingredient to the product without hindering the attempt to decrease calorie content. The use of nutmeats of soy protein imitation available from Archer-Daniel Midlands Company as Textured Vegetable Protein has been found advantageous. Although the texture and mouth-feel of soy protein is not precisely like nutmeats, the flavor is excellent and makes a contribution to the flavor and appearance of the nougat.

In order more clearly to disclose the nature of the present invention, specific examples of the practice of the invention are hereinafter given. It should be understood, however, that this is done solely by way of example and is intended neither to delineate the scope of the invention nor limit the ambit of the appended claims.

EXAMPLE 1

The following example illustrates a nougat candy composition having a reduced calorie content.

Nougat products were prepared substituting various amounts of gum arabic and microcrystalline cellulose, and artifical sweeteners for the beet sugar, corn nougat and vegetable fat used in the usual high calorie nougat compositions. The formulas are shown in Table 1, where the ingredients are given in percent by weight on a "finished basis." The "finished basis" is the candy as available to the consumer. Commercially available Avicel PH-E-105 was used as the microcrystalline cellulose. Gum arabic at 50% identifies aqueous solutions containing 50 pounds of gum arabic in each one hundred pounds of solution.

The 70/30 fondant is a mixture of 70 percent beet sugar and 30 percent corn syrup which has been cooked to 248° F. and worked on a mixture so as to develop very fine sugar crystals. The Mazetta is an aerated mixture of about 69.5 percent corn syrup solids, 28.8 percent beet sugar and 1.7 percent dried egg solids with a moisture content of about 14.5 percent.

The high fructose sweetener used is a starch hydrolyzate which is sweeter than any other corn sweetener currently available and is available from Clinton Corn Processing Company, Clinton, Iowa, under the name "Isomerose 30." The carbohydrate components of Isomerose 30 are: monosaccharides 57% (fructose 14%, dextrose 43%), disaccharides 31% higher saccharides 12%. Fructose is a carbohydrate having almost twice the sweetness of sucrose.

TABLE 1.—COMPARATIVE CANDY COMPOSITIONS

| | Control | Batch A |
|---|---|---|
| Gum arabic at 50% | None | 14.70 |
| Microcrystalline cellulose | None | 9.97 |
| High fructose content sweetener | 5.27 | 3.90 |
| Beet sugar | 32.80 | 24.50 |
| Corn syrup | 30.73 | 17.50 |
| Pecans | 3.16 | None |
| Soy protein | None | 1.77 |
| Salt | 0.37 | 0.50 |
| Mazetta | 12.10 | 11.72 |
| 70/30 fondant | 1.95 | None |
| Vegetable fat | 5.10 | 2.48 |
| Flavoring | 0.55 | 1.14 |
| Water | 8.00 | 12.00 |
| Total | 99.93 | 100.08 |

The product was evaluated by a panel of experts and found to be satisfactory in regard to flavor, mouthfeel, consistency, and the like. The calorie content of each of the batches was calculated based on calorie values as described in "Composition of Foods" by B. K. Watts and A. L. Merrill, Agricultural Handbook No. 8, Consumer and Food Economics Research Division, United States Department of Agriculture, Revised December 1963, Superintendent of Documents, United States Government Printing Office, Washington, D.C. The sole exceptions are the calorie content of Isomerose 30 and soy protein which were obtained from the manufactures. The results are shown in Table 2.

TABLE 2.—CALORIE CONTENT

| | Control | Batch A |
|---|---|---|
| Calories per 100 grams (dry basis) | 388.5 | 255.1 |
| Reduction in calories, percent | | 34.3 |

The procedure of Example 1 was repeated substituting varying amounts of gum arabic and microcrystalline cellulose in the compositions. The experimental compositions were rated by candy experts as satisfactory (S) or unsatisfactory (U). The results are shown in Table 3.

TABLE 3.—EFFECT OF VARYING GUM ARABIC AND MICROCRYSTALLINE CELLULOSE

| Example | Gum arabic, percent | Microcrystalline cellulose, percent | Ratio | As percent of product | Evaluation | Caloric content per 100 g. | Calorie reduction |
|---|---|---|---|---|---|---|---|
| 2 | 9.7 | 22.6 | 30:70 | 32.3 | U | 218.7 | 43.8 |
| 3 | 13.5 | 31.5 | 30:70 | 45 | U | 177.6 | 54.3 |
| 4 | 7.1 | 16.5 | 30:70 | 23.6 | U | 246.8 | 36.5 |
| 5 | 9.5 | 14.1 | 40:60 | 23.6 | S | 246.8 | 36.5 |
| 6 | 13.2 | 20 | 40:60 | 33.2 | S | 215.7 | 44.5 |
| 7 | 18 | 27 | 40:60 | 45 | S | 177.6 | 54.3 |
| 8 | 11.8 | 11.8 | 50:50 | 23.6 | S | 246.8 | 36.5 |
| 9 | 16.6 | 16.6 | 50:50 | 33.2 | S | 215.7 | 44.5 |
| 10 | 22.5 | 22.5 | 50:50 | 45 | S | 177.6 | 54.3 |
| 11 | 14.1 | 9.5 | 60:40 | 23.6 | S | 246.8 | 36.5 |
| 12 | 20 | 13.2 | 60:40 | 33.2 | S | 215.7 | 44.5 |
| 13 | 27 | 18 | 60:40 | 45 | S | 177.6 | 54.3 |
| 14 | 31.5 | 13.5 | 70:30 | 45 | U | 177.6 | 54.3 |
| 15 | 36 | 9 | 80:20 | 45 | U | 177.6 | 54.3 |
| 16 | 33.1 | 22.1 | 60:40 | 55.2 | U | 144.7 | 62.5 |
| 17 | 11.3 | 28.3 | 28.5:71.5 | 39.6 | U | 129.2 | 66.5 |
| 18 | 20.4 | 25.5 | 44.4:55.6 | 45.9 | U | 195.1 | 49.8 |
| 19 | 25.5 | 20.4 | 55.6:44.4 | 45.9 | S | 174.7 | 55.1 |

Based on the results of the foregoing experimentation it was determined that a reduced calorie candy composition may have the following composition:

A. Nine to 27 percent gum arabic;
B. One to 27 percent microcrystalline cellulose;
C. One to 30 percent beet sugar;
D. One to 26 percent corn syrup;
E. One to 3 percent vegetable fat; and
F. Artificial sweeteners, flavoring and the like along with other ingredients normally present in a candy composition.

When the foregoing gum arabic concentration is exceeded, the composition becomes tough and rubbery. When the foregoing concentration of microcrystalline cellulose is exceeded, the composition becomes dry and unpalatable.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A reduced calorie nougat candy composition comprising—

Ingredient:     Percent by weight
  A. Gum arabic _____ 9 to 27
  B. Microcrystalline cellulose _____ 9 to 23
  C. High fructose content sweetener ____ 1 to 6
  D. Beet sugar _____ 20 to 30
  E. Corn syrup _____ 15 to 26
  F. Soy protein _____ 0 to 3.5
  G. Vegetable fat _____ 1 to 3

2. A reduced calorie nougat candy composition comprising the following ingredients in about the following proportions—

| Ingredient: | Percent by weight |
|---|---|
| A. Gum arabic | 14.70 |
| B. Microcrystalline cellulose | 9.97 |
| C. High fructose content sweetener | 3.90 |
| D. Beet sugar | 24.90 |
| E. Corn syrup | 17.50 |
| F. Soy protein | 1.77 |
| G. Vegetable fat | 2.48 |

References Cited

UNITED STATES PATENTS

| 3,023,104 | 2/1962 | Battista | 99—134 R |
| 2,776,212 | 1/1957 | Andregg | 99—126 |

OTHER REFERENCES

Food Processing, "Patman Food Awards," July 1971.

A. LOUIS MONACELL, Primary Examiner

J. M. HUNTER, Assistant Examiner

U.S. Cl. X.R.

426—214